United States Patent [19]
Gratzer

[11] Patent Number: 5,547,054
[45] Date of Patent: Aug. 20, 1996

[54] FREE-WHEELING COUPLING SENSITIVE TO THE DIRECTION OF ROTATION

[75] Inventor: Franz Gratzer, St. Johann, Austria

[73] Assignee: Steyr-Daimler-Puch AG, Vienna, Austria

[21] Appl. No.: 303,355

[22] Filed: Sep. 9, 1994

[30] Foreign Application Priority Data

Sep. 8, 1993 [DE] Germany ............ 43 30 435.4

[51] Int. Cl.⁶ ............ F16D 41/08; B60K 23/08
[52] U.S. Cl. ............ 192/35; 192/38; 192/44
[58] Field of Search ............ 192/352, 36, 37, 192/38, 43, 44

[56] References Cited

U.S. PATENT DOCUMENTS

| | | | |
|---|---|---|---|
| 3,055,471 | 9/1962 | Warn et al. ............ | 192/38 X |
| 3,300,002 | 1/1967 | Roper ............ | 192/35 |
| 3,406,798 | 10/1968 | Curran ............ | 192/35 |
| 4,124,085 | 11/1978 | Fogelberg . | |
| 4,361,216 | 11/1982 | Overbeek ............ | 192/36 |
| 5,103,950 | 4/1992 | Ito et al. ............ | 192/35 |

FOREIGN PATENT DOCUMENTS

| | | |
|---|---|---|
| 2740638 | 3/1978 | Germany . |
| 4201375 | 8/1993 | Germany . |
| 4202152 | 8/1993 | Germany . |
| 4225202 | 9/1993 | Germany . |

*Primary Examiner*—Richard M. Lorence
*Attorney, Agent, or Firm*—Meltzer, Lippe Goldstein et al.

[57] ABSTRACT

A free-wheeling coupling sensitive to the direction of rotation for a motor vehicle comprises a first ring which constitutes a driven element in a towing mode of the vehicle, a second ring which constitutes a driven element in the towing mode, clamping elements (e.g., rollers) which act between the first and second rings to transfer torque between them in both directions of torque flow, a cage in which the clamping elements are disposed, and a friction element acting between the cage and the second ring. The free-wheeling coupling further comprises a fixed switching ring, a cam rotatably mounted on the cage or the first ring, the cam including a control lever, and a spring which urges the control lever into engagement with the fixed switching ring until there is sufficient centrifugal force to lift the control lever out of engagement with the fixed switching ring. A stop finger fixedly connected to the first ring or to the cage interacts with the cam to limit the relative rotation between the first ring and the cage.

12 Claims, 5 Drawing Sheets

REVERSE TOW

FORWARD TOW

REVERSE THRUST

FORWARD THRUST

REVERSE FORWARD
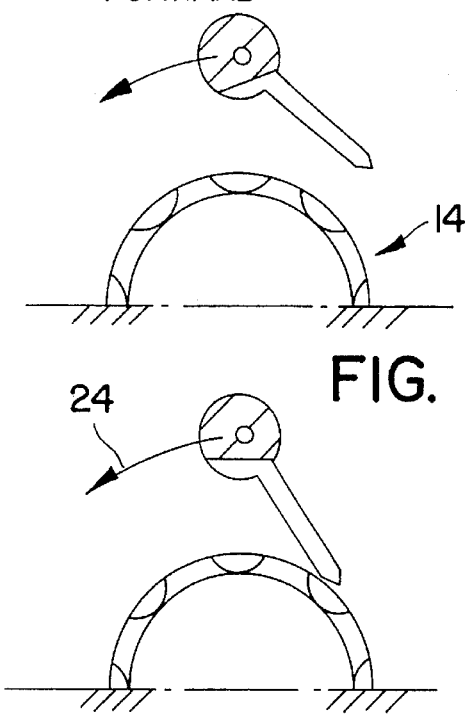
FIG. 4a
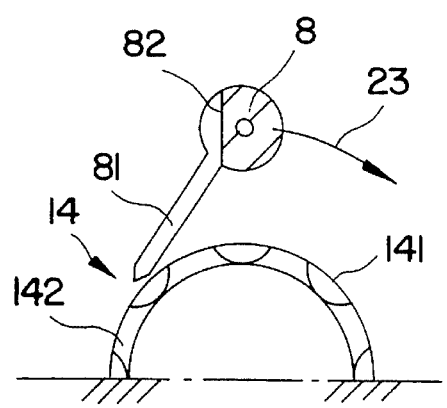
FIG. 4d
FIG. 4b
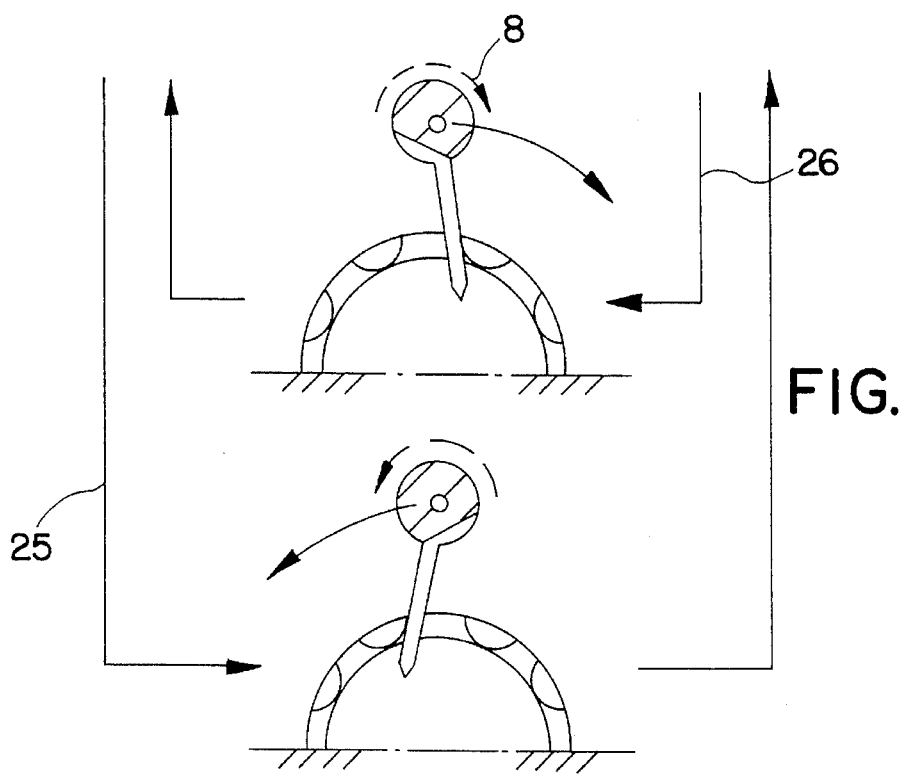
FIG. 4c
FIG. 4e

FREE-WHEELING COUPLING SENSITIVE TO THE DIRECTION OF ROTATION

BACKGROUND OF THE INVENTION

In an all-wheel drive motor vehicle with a second drive axle (usually the rear axle) driven via a slip-controlled coupling, the problem exists that the rear wheels tend to over-brake and thus lose ground adhesion, leading to skidding of the vehicle. This happens because of the connection to the front wheels. The condition is especially apparent when the vehicle employs an ABS system, and in cases of lock-up braking.

For this reason the additional utilization of a dual action free-wheeling coupling (sometimes referred to as an overrunning clutch) is customary so that a controllable separation coupling does not have to be used, and yet all-wheel drive in reverse travel is possible. For this reason dual-action clamping element couplings have been proposed, in which differential rotational speed sensing elements ensure coupling in both directions of torque flow and where centrifugal elements prevent a torque flow reversal at high speed (e.g., the German patent applications DE 42 01 375, 42 02 152 and 42 25 202 by the assignee herein). These solutions have the disadvantage, however, that when the circumferential speeds of the front and rear wheels differ because of tire wear or due to layout necessities, stress within the vehicle occurs at low speed and low load causing not only performance losses but also causing the clamping elements to be held in the clamped position. For this reason other solutions to this problem have been investigated.

The instant invention therefore relates to a rotationally dependent free-wheeling coupling comprising the following elements: a first ring which is the driving element in towing mode; a second ring which is the driven element in towing mode; clamping elements which act between the first and the second rings in both torque flow directions; a cage which holds the clamping elements; and a friction element actively connecting the cage to the second ring. (In this description, the "towing mode" refers to the situation wherein the engine drives the vehicle and torque flows from the engine to the axle, whether the vehicle is in forward or reverse travel. "Thrust mode" is the situation wherein the engine brakes the vehicle and torque flows from the axle to the engine.)

Such a free-wheeling coupling with clamping or wedging rollers acting in both directions for the transmission of drive forces to a second drive axle of a vehicle (here the front axle) is known from DE-A 27 40 638 (U.S. Pat. No. 4,124,085). A frictional connection exists between the ring pertaining to the second drive axle and a clamping roller cage. When overrunning occurs, a latch mechanism controlled via a second frictional connection to the fixed housing prevents the clamping roller cage from moving into the position in which towing or thrust torque flows from the second drive axle to the drive mechanism of the vehicle or to the first drive axle.

If reliable switching is desired in the free-wheeling coupling described therein, it is necessary to use a frictional element sensing the absolute rotational speed which has the disadvantages of relatively high power loss and a tendency to wear. Even so, reliable switching at extreme accelerations, e.g., with lock-up braking, is not ensured because of the high inertial forces acting on the cage. Under extreme conditions of torque change, "breakthrough," a situation wherein the clamping elements disengage from the ramps associated with one torque flow direction and overshoot to the ramps for the opposite torque flow direction, can occur. The free-wheeling operation may thus be bridged even in towing mode. This can result in locking of the wheels of the second drive axle, a loss of braking of stability, and even destruction of the free wheeling device under certain circumstances.

Another dual action free-wheeling coupling of a similar type was proposed in the as yet unpublished German patent application DE-43 11 288 (corresponding to U.S. application Ser. No. 08/222,802, filed Apr. 5, 1994) of the presented assignee. In the device described therein, completely friction and wear-free operation and protection against breakthrough when the direction of torque flow changes is ensured in all continuous operation states due to the interaction of a latch with the cage under the influence of a retaining spring and a slipping spring. However, there are still situations even with this free-wheeling coupling when faultless operation is not ensured. Even if such situations occur rarely, it is necessary to correct them in view of the safety standards applied today in the construction of motor vehicles.

Such a situation arises, for example, as follows: When the vehicle climbs a slope in reverse and torque is thereby being transmitted to the rear axle, the free-wheeling device assumes a configuration that is not an accessible configuration for forward travel in the thrust mode. Thus, when the driver stops the vehicle, shifts to a forward speed and lets the vehicle roll without operating the accelerator, the free-wheeling device cannot shift into the proper configuration. It is therefore not certain that the free-wheeling coupling will have zero torque in case of subsequent ABS braking.

It is therefore the object of the invention, while avoiding the disadvantages of the two designs described above, to provide a free-wheeling coupling sensitive to the direction of rotation which has at its disposal sufficient switching force, with minimal friction losses, in all continuous operation states to access the proper configurations so as to avoid such problems in exceptional situations.

SUMMARY OF THE INVENTION

In accordance with the present invention, a free-wheeling coupling sensitive to the direction of rotation for a motor vehicle comprises a first ring which constitutes a driving element in a towing mode of the motor vehicle, a second ring which constitutes a driven element in the towing mode, clamping elements (e.g., clamping rollers) which act between the first and second rings to transfer torque between them in both directions of torque flow, a cage in which the clamping elements are disposed, and a friction element acting between the cage and the second ring. The free-wheeling coupling further comprises a fixed switching ring, a cam rotatably mounted on the cage or the first ring, the cam including a control lever, and a spring which urges the control lever into engagement with the fixed switching ring until there is sufficient centrifugal force to lift the control lever out of engagement with the fixed switching ring. A stop finger fixedly connected to the first ring or to the cage interacts with the cam to limit the relative rotation between the first ring and the cage.

Thanks to the fixed switching ring, the orientation of the cam is dependent only on the direction of rotation. Depending on its own orientation, the cam influences the angular position between the cage and the first ring. In reverse travel, the cam has no effect at all, and for this reason both directions of torque flow (controlled by the friction element) are possible. In forward travel, the cam remains inactive only in towing mode and the transmission of torque is possible. In thrust mode, the cage is caught in neutral position by the interaction of the cage, a stop and the friction element, and torque is not transmitted. Thanks to the fixed switching ring, the reversal of direction of rotation suffices to make it possible to go from reverse/towing mode into forward/thrust mode under all circumstances. Centrifugal force ensures that at higher speeds, no rubbing by the cam against the fixed switching ring occurs any more. A control lever and holding spring ensure the desired effect of the centrifugal force.

In a practical embodiment, the fixed switching ring has switching fingers which interact with the control lever. In another embodiment, the active connection between switching ring and control lever is only frictional. In this manner, a certain force due to interlocking switch-over is achieved in one case, and in the other case noise is avoided while a somewhat gentler, frictional switch-over is achieved.

The frictional switch-over is especially gentle if the control lever is connected to the cam in a non-rotatable, but radially movable manner under the force of a spring. In both cases, an additional improvement can be achieved by means of a stop at the control lever or cam with a slight twist clearance between the two. The stop ensures that the control lever which is forced outwardly by the centrifugal force does not cause friction even at very high rotational speeds and the twist clearance effects, that the intervention of the control lever is not impaired by the friction between cam and stop.

Although the insertion of different clamping elements (so long as they act in both directions) and the selection of a different distribution of rollers between rings and cage fall within the framework of the invention, the clamping elements are clamping rollers in an embodiment which is particularly advantageous from the point of view of manufacturing costs and structural size. In this case, the first ring is a polyhedral inner ring and the cam is mounted rotatably on the cage.

BRIEF DESCRIPTION OF THE DRAWINGS

The invention is further explained by reference to the drawings, wherein:

FIGS. 4a–4e is a second set of schematic drawings to explain the operation of the coupling of FIGS. 1 and 2;

DETAILED DESCRIPTION OF PREFERRED EMBODIMENTS

Figure 1:
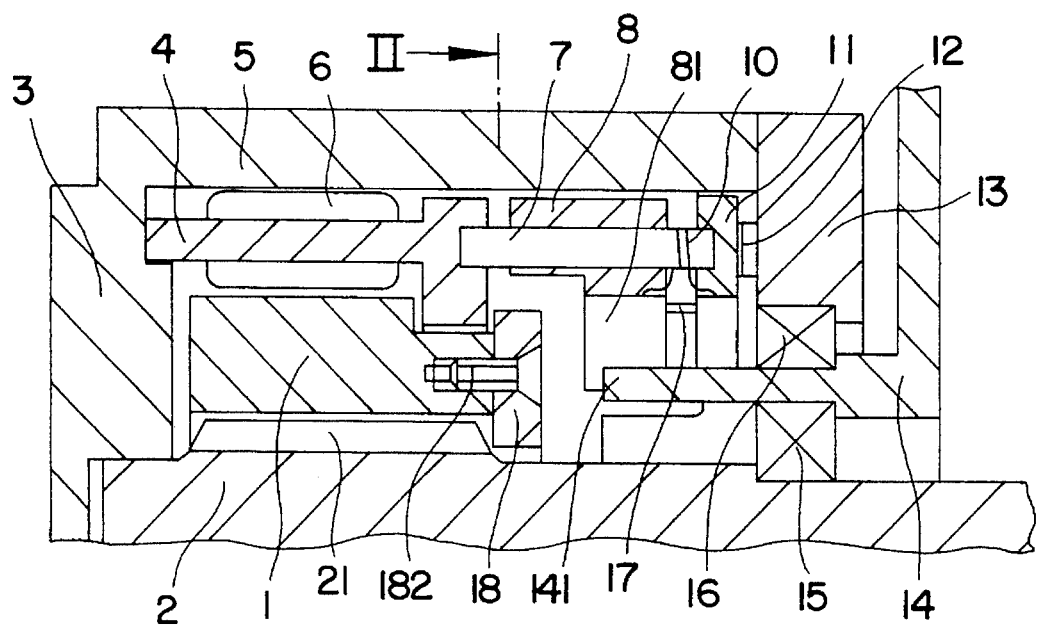
FIG. 1 shows an axial section through a first embodiment of the invention.
Figure 2:
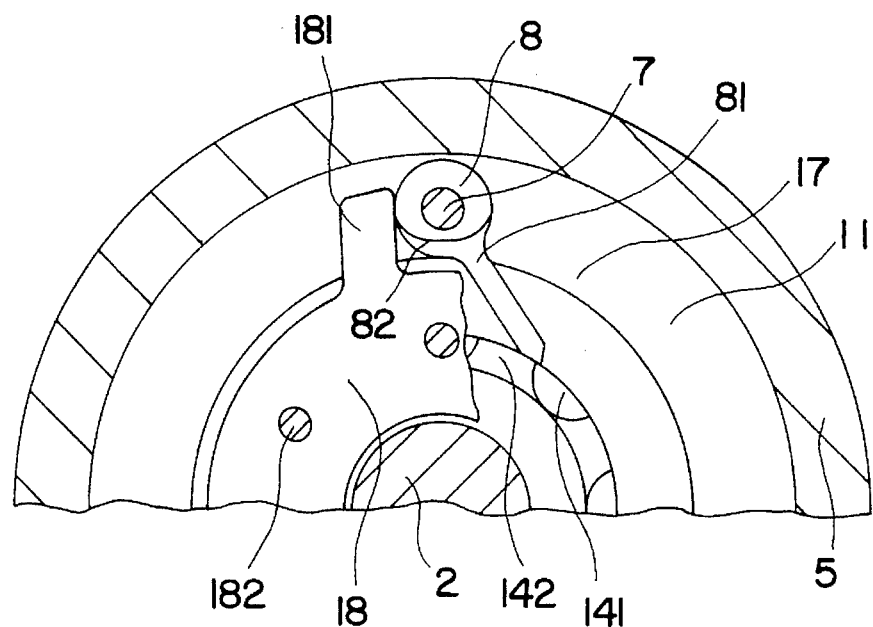
FIG. 2 shows a cross-section along II—II of FIG. 1.

FIGS. 1 and 2 show a free-wheeling coupling in the drive train of an all-wheel-drive motor vehicle. Its inner ring 1 is connected for drive to a permanently driven axle (e.g., to a front axle united to a not shown engine transmission block) by an input shaft 2, to which it is joined through splines 21, and is mounted in a first bearing plate 3. The bearing plate 3 is fixedly connected to a second ring 5 which may be connected for drive to a rear axle which is not shown. Between the first ring 1 which is the inner ring, and the second ring 5 which is the outer ring, a row of clamping elements 6 is installed and controlled by a cage 4.

The clamping elements 6 may be clamping rollers or symmetrical sprags acting in both directions. In the freewheeling coupling shown in the drawings, clamping elements 6 are clamping rollers, and the first ring 1 is accordingly made in a known manner in polyhedral form in order to create run-up surfaces or ramps for the clamping rollers 6. A cam axle 7 is mounted in the cage 4, and on it a cam 8 is installed rotatably. The cam 8 consists of a part which extends towards the cage 4 and a part away from cage 4. The part of cam 8 extending towards cage 4 includes cam surface 82, while the part away from cage 4 includes an inward-reaching control lever 81. The cam axle 7 is also connected fixedly to a friction ring 11 so that the latter rotates together with the cage 4, for which additional, not shown, connections may be provided between friction ring 11 and cage 4. A retaining spring 10 in the form of a torsion spring tends to align the control lever 81 towards the interior and bears upon the friction ring 11. The friction ring 11 may be provided with a friction lining, but preferably an axially acting undulating spring 12 (sinusoidal disk) is provided which presses against the inside of a second bearing shield 13. In addition, a control lever stop 17 is provided in the friction ring 11 to limit the movement of the control lever 81 due to centrifugal force.

A switching ring 14 is fixedly connected to a housing (not shown) and is therefore stationary. It is perforated at its end towards the inner ring 1 so that switching fingers 141 and clearances 142 alternate (FIG. 2). Between the switching ring 14 and the input shaft 2, a first bearing 15 is installed, and between the switching ring 14 and the second bearing plate 13, a second bearing 16 is installed. Finally, a stop disk 18 is attached to the first ring 1 by means of screws 182, and a stop finger 181 extends outward from said stop disk 18 and interacts with the cam surface 82.

Figure 3A:
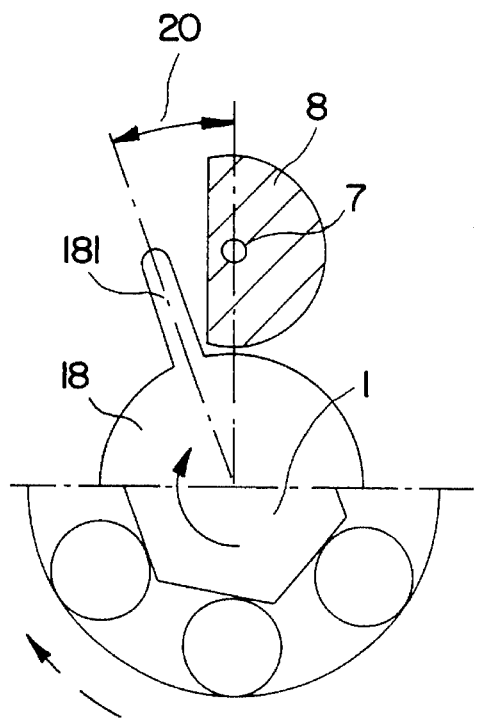
FIGS. 3a–3d is a first set of schematic drawings to explain the operation of the coupling of FIGS. 1 and 2.
Figure 3B:
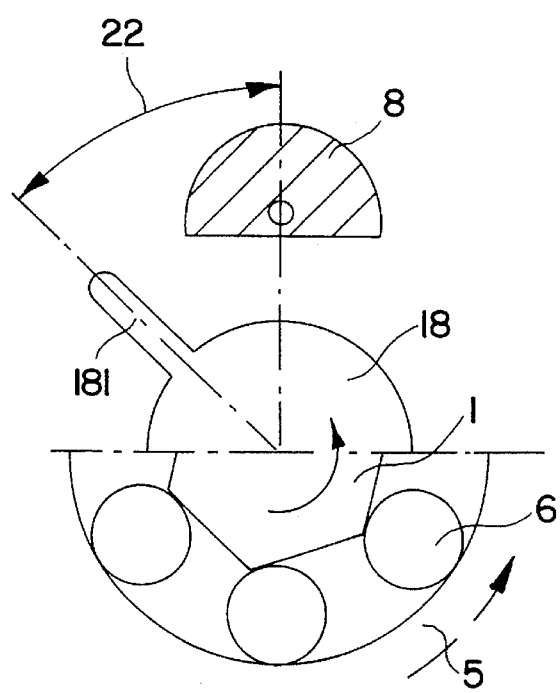
Figure 3C:
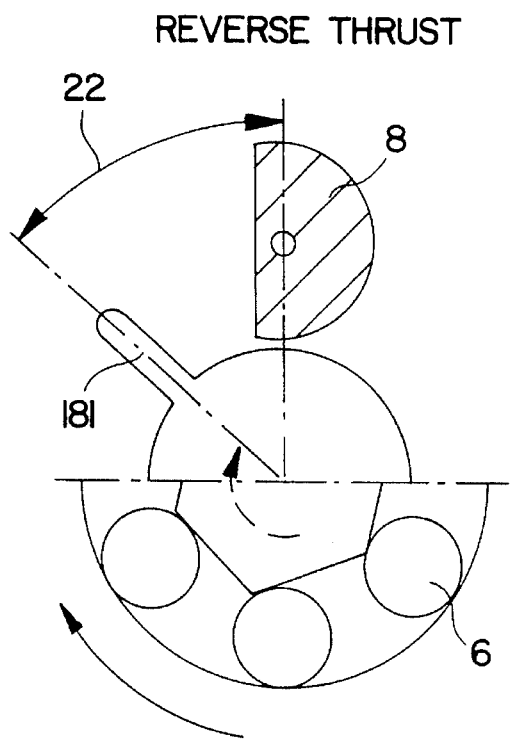
Figure 3D:
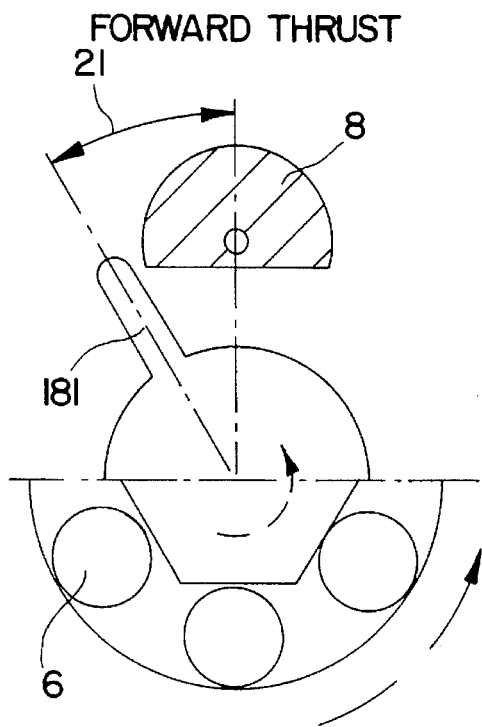

The functioning of this free-wheeling coupling will now be explained through FIGS. 3a–3d and 4a–4e: In FIGS. 3a–3d, four working configurations can be seen, i.e., FIG. 3a is reverse travel in towing mode, FIG. 3b is forward travel in towing mode, FIG. 3c is reverse travel in thrust mode, and FIG. 3d is forward travel in thrust mode. To facilitate the understanding of the invention, the arrows symbolizing movements of driving elements are drawn in solid lines, movements for driven elements are drawn in dashed lines, and movements for free-running elements are drawn in dash-dot lines. The rotational position of the cam 8 determines the position of the stop finger 181 and thereby of the inner ring 1 in relation to the cage 4 in which the axle 7 of the cam 8 is supported. Reverse travel in towing mode represents one of the two possible directions of torque flow, and in that case the angle 20 between the stop finger 181 and the cam 8 is smallest. In forward travel in thrust mode (e.g., during braking), no torque is transmitted. The cam 8 is therefore oriented so that it serves as a stop for stop finger 181 and thus determines an angle 21. The angle 21 corresponds to the neutral position of the clamping elements 6. Towing mode for forward travel and thrust mode for reverse travel require the other of the two possible directions of torque flow and therefore the greatest possible angle 22 between the stop finger 181 and the cam 8.

The manner in which the cam 8 is moved must also be explained. This is shown by FIGS. 4a–4e. The stationary switching ring has been designated with reference number 14. The cam 8 is rotatably mounted on the cage 4 and therefore rotates together with it, as is indicated by the arrows 23 and 24. FIG. 4d shows the orientation of cam 8 for reverse travel is drawn, and it is the same as FIGS. 3a and 3c. The cam 8 moves in relation to the inner ring 1 as indicated by arrow 23. During forward travel (FIGS. 4a and 4b), the cam 8 is in the same angular position as FIGS. 3b and 3d. In FIG. 4a, the stop finger 181 is lifted from the switching ring 14 at high speed due to the effect of the centrifugal force.

In FIGS. 4a and 4c, the events during a change in rotational direction are depicted. During the passage from reverse to forward travel (arrow 25), the cage 4 together with cam 8 changes their sense of rotation (from that of arrow 23 to that of arrow 24). As a result, the control lever 81 is seized by the switching finger 141, is guided into a clearance 142, and is slaved by the relative rotation between switching ring 14 and cage 4. At the end of this movement, control lever 81 is released again by the switching ring 14 and is then again pulled over switching ring 14 under the pressure of the holding spring 10 (FIG. 1), lifting off at high rotational speeds. During the passage from forward travel to reverse travel (arrow 26), the events are repeated in reverse order.

Figure 5:
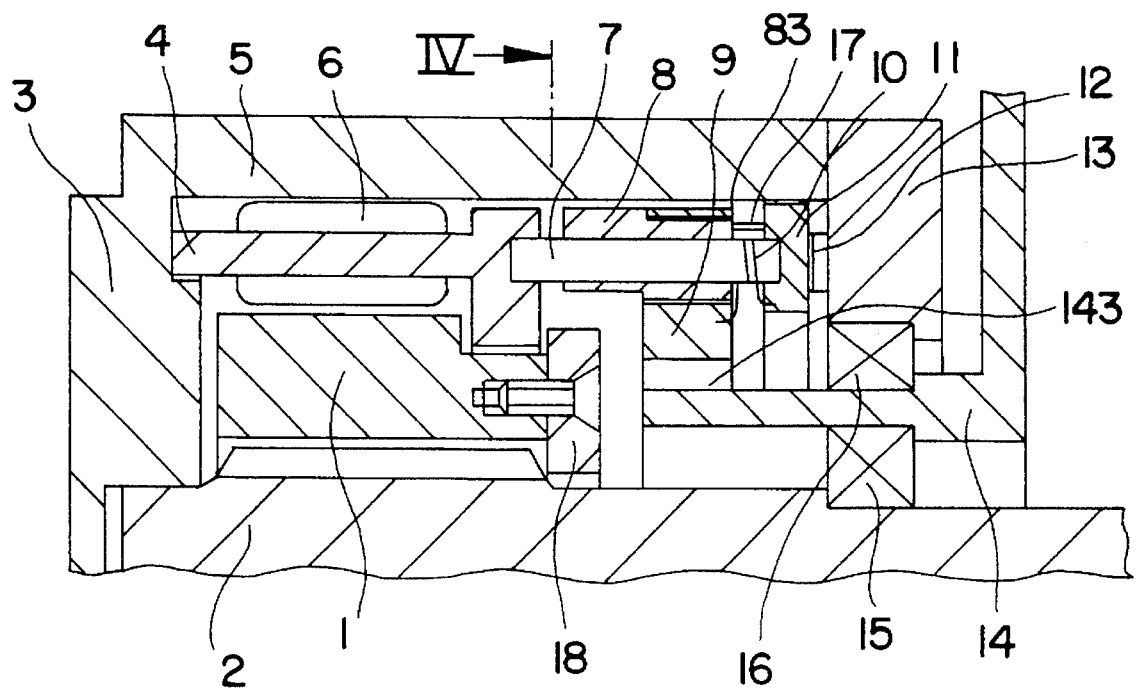
FIG. 5 shows a section through a second embodiment of the invention.
Figure 6:
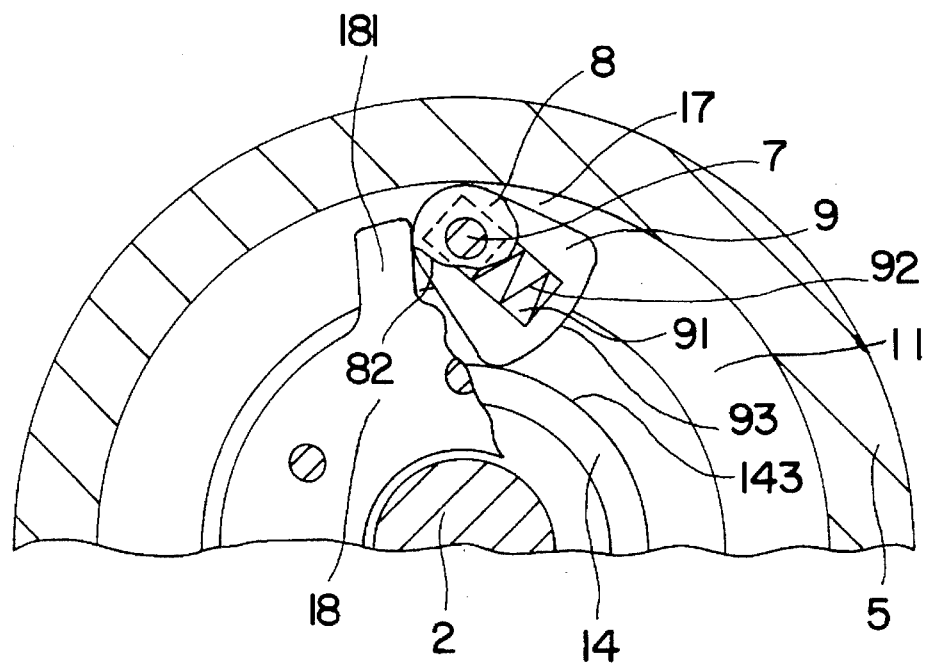
FIG. 6 shows a cross-section along IV—IV of FIG. 5.

The embodiment shown in FIGS. 5 and 6 is different from that of FIGS. 1 and 2 only through a different actuation mechanism for the cam 8. In the embodiment of FIGS. 5 and 6, the cam 8 is provided with a slide ring 83 instead of the control lever 81. A displaceable control lever 9 which is a separate component is mounted on slide ring 83. Control lever 9 has a slit 91 which slides over the slide ring 83, and a spring 92 which pushes the control lever 9 into its innermost position. The control lever 9 is furthermore provided with an interior countersurface 93 which interacts with a friction surface 143 of the switching ring 14. In this embodiment, the friction surface 143 of switching ring 143 is continuous. Where the control lever 81 is slaved interlockingly between the switching fingers 141 in the embodiment of FIGS. 1 and 2, in this embodiment the control lever 9 is switched into its other position by frictional engagement. In order to ensure smooth switching, it is advantageous to provide a clearance (which cannot be shown) between the slide ring 83 and the slit 91, said clearance providing a certain angular mobility to the control lever 9.

Secure operation in all operating states, i.e., also in difficult transition states, is achieved with the described design, with minimal friction losses, and without external intervention.

Figure 7:
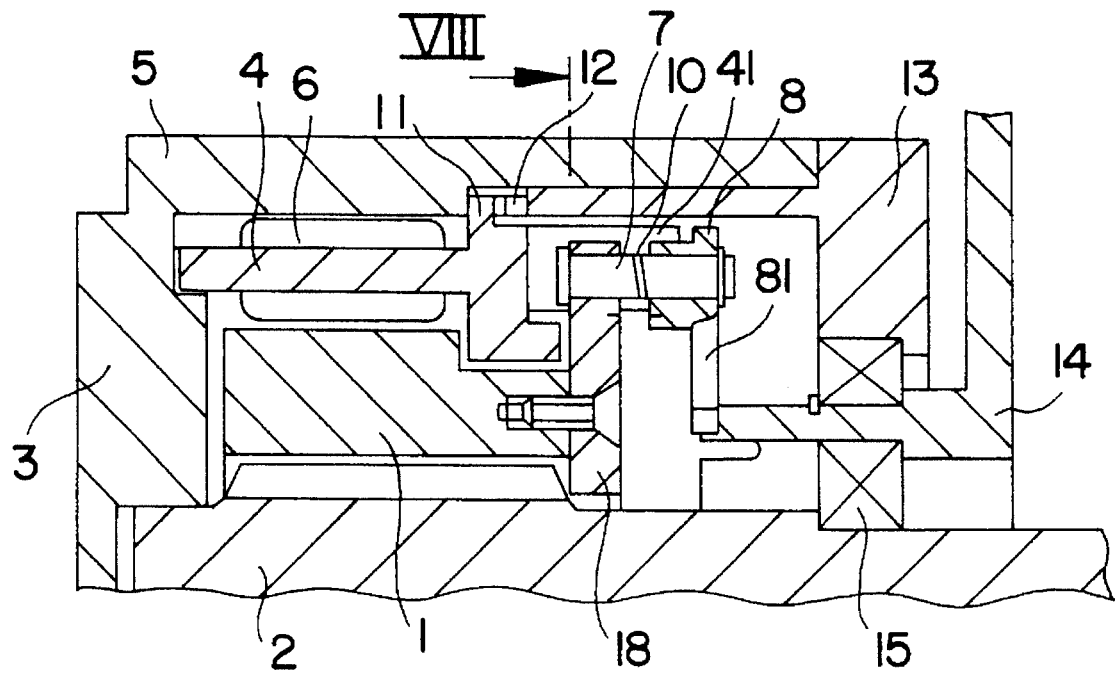
FIG. 7 shows an axial section through a third embodiment of the invention.
Figure 8:
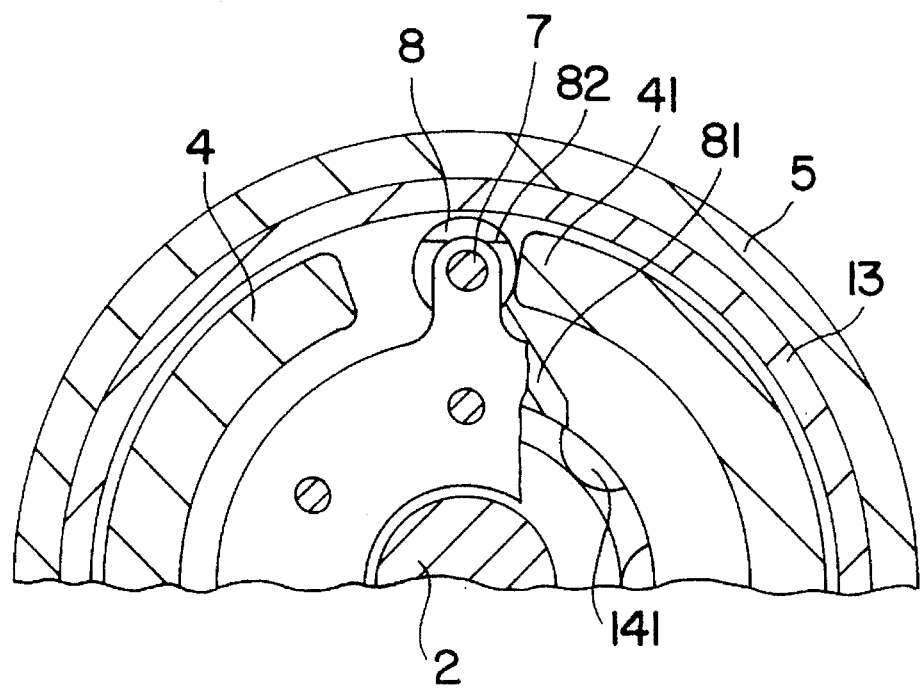
FIG. 8 shows a cross-section along VIII—VIII of FIG. 7.

The embodiment shown in FIGS. 7 and 8 is different from that of FIGS. 1 and 2 in that cam 8 on cam axle 7 is mounted on inner ring 1. Additionally, a stop 41 is fixedly attached to cage 4 in place of the stop finger 181 of stop disk 18. In all other respects, the embodiment of FIGS. 7 and 8 is the same as the embodiment of FIGS. 1 and 2, and like components have been given like numerals.

While the invention has been described by reference to specific embodiments, this was for purposes of illustration only. Numerous alternative embodiments will be apparent to those skilled in the art and are considered to be within the scope of the invention.

I claim:

1. A free-wheeling coupling sensitive to the direction of rotation for a motor vehicle, comprising a first ring which constitutes a driving element in a towing mode for a motor vehicle, a second ring which constitutes a driven element in said towing mode, clamping elements which act between said first and second rings to transfer torque between said first and second rings in both directions of torque flow, a cage in which said clamping elements are disposed, a friction element acting between said cage and said second ring, a fixed switching ring, a cam rotatably mounted on said cage, said cam including a control lever which interacts with said fixed switching ring, a spring which urges said control lever into engagement with said fixed switching ring until there is sufficient centrifugal force to lift said control lever out of engagement with said fixed switching ring, and a stop finger fixedly connected to said first ring which interacts with said cam to limit the relative rotation between said first ring and said cage.

2. The free-wheeling coupling of claim 1 wherein said fixed switching ring includes switching fingers which interact with said control lever.

3. The free-wheeling coupling of claim 1 wherein said fixed switching ring includes a cylindrical friction surface which is frictionally engaged with a counter-surface of said control lever.

4. The free-wheeling coupling of claim 3 wherein said control lever is non-rotatably but radially movably connected to said cam, and wherein said spring urges said control lever into frictional engagement with said friction surface of said fixed switching ring.

5. The free-wheeling coupling of claim 1 further comprising a stop for said cam or said control lever with a small twist clearance between said cam and said control lever.

6. The free-wheeling coupling of claim 1 wherein said clamping elements are clamping rollers and said first ring comprises an inner polyhedral ring.

7. A free-wheeling coupling sensitive to the direction of rotation for a motor vehicle, comprising a first ring which constitutes a driving element in a towing mode for a motor vehicle, a second ring which constitutes a driven element in said towing mode, clamping elements which act between said first and second rings to transfer torque between said first and second rings in both directions of torque flow, a cage in which said clamping elements are disposed, a friction element acting between said cage and said second ring, a fixed switching ring, a cam mounted on said first ring, said cam including a control lever which interacts with said fixed switching ring, a spring which urges said control lever into engagement with said fixed switching ring until there is sufficient centrifugal force to lift said control lever out of engagement with said fixed switching ring, and a stop connected to said cage which interacts with said cam to limit the relative rotation between said first ring and said cage.

8. The free-wheeling coupling of claim 7 wherein said fixed switching ring includes switching fingers which interact with said control lever.

9. The free-wheeling coupling of claim 7 wherein said fixed switching ring includes a cylindrical friction surface which is frictionally engaged with a counter-surface of said control lever.

10. The free-wheeling coupling of claim 9 wherein said control lever is non-rotatably but radially movably connected to said cam, and wherein said spring urges said control lever into frictional engagement with said friction surface of said fixed switching ring.

11. The free-wheeling coupling of claim 7 further comprising a stop for said cam or said control lever with a small twist clearance between said cam and said control lever.

12. The free-wheeling coupling of claim 7 wherein said clamping elements are clamping rollers and said first ring comprises an inner polyhedral ring.

* * * * *